United States Patent

Brushafer et al.

[11] Patent Number: 5,843,542
[45] Date of Patent: Dec. 1, 1998

[54] WOVEN FABRIC HAVING IMPROVED FLEXIBILITY AND CONFORMABILITY

[75] Inventors: Robert J. Brushafer, West Chester; Gerald T. Lien, Exton; Janice R. Maiden, Oreland, all of Pa.

[73] Assignee: Bentley-Harris Inc., Exton, Pa.

[21] Appl. No.: 966,614

[22] Filed: Nov. 10, 1997

[51] Int. Cl.$^6$ ..................................................... F16L 11/00
[52] U.S. Cl. ................... 428/36.1; 138/123; 428/36.92; 442/208; 442/209
[58] Field of Search .................... 428/36.1, 36.3, 428/36.9, 36.92; 138/123; 442/208, 209

[56] References Cited

U.S. PATENT DOCUMENTS

| | | | |
|---|---|---|---|
| 1,606,810 | 11/1926 | Saylor . | |
| 5,217,770 | 6/1993 | Morris, Jr. et al. | 428/36.3 |
| 5,556,495 | 9/1996 | Ford et al. | 156/148 |
| 5,613,522 | 3/1997 | Ford et al. | 138/123 |

*Primary Examiner*—James J. Bell
*Attorney, Agent, or Firm*—Synnestvedt & Lechner

[57] ABSTRACT

A woven fabric sleeve for protecting and covering elongated substrates is made up of circumferentially and longitudinally extending interlaced fill and warp members, the fill members forming circumferentially extending alternating bands of relative flexibility separating bands of inflexibility. The fill members may be comprised of monofilament or multifilament yarns of alternating large and small diameters and may include wire, especially resilient wire, heat settable materials, including polyester served wire and DREF yarns having resiliently settable cores. The fill members may be held in relation to one another utilizing Leno and mock Leno weaving.

14 Claims, 5 Drawing Sheets

FIG.1a
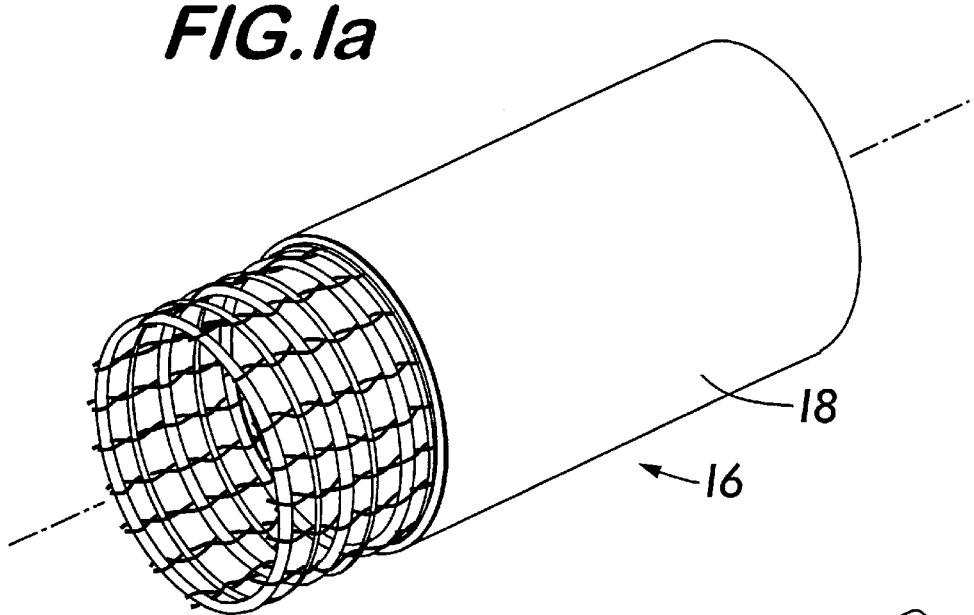
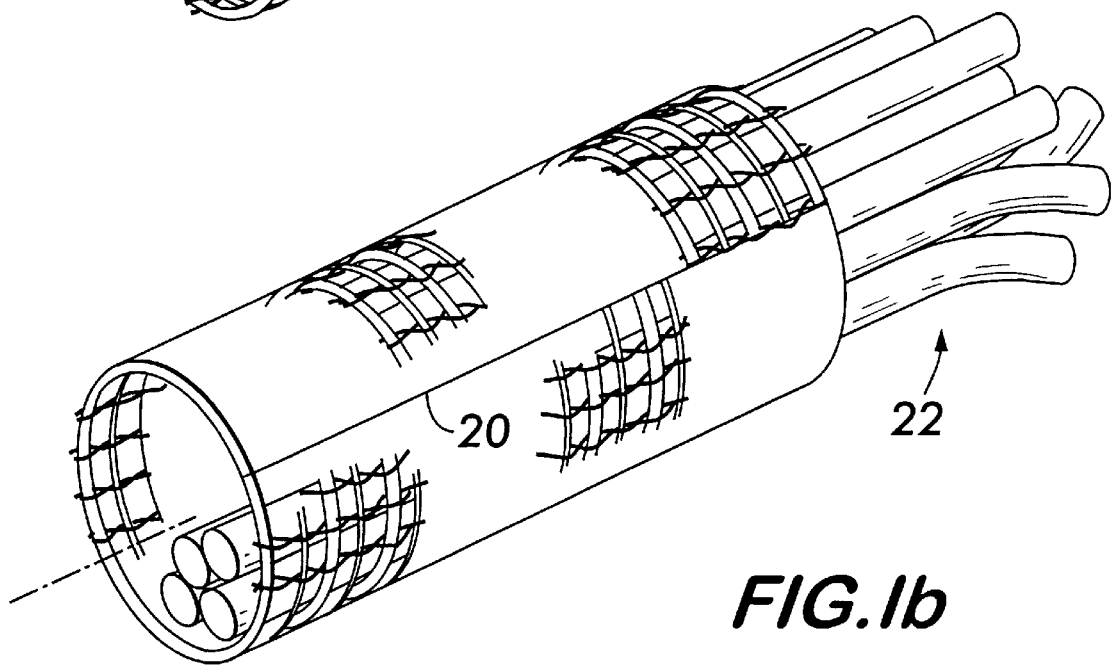
FIG.1b

FIG.4
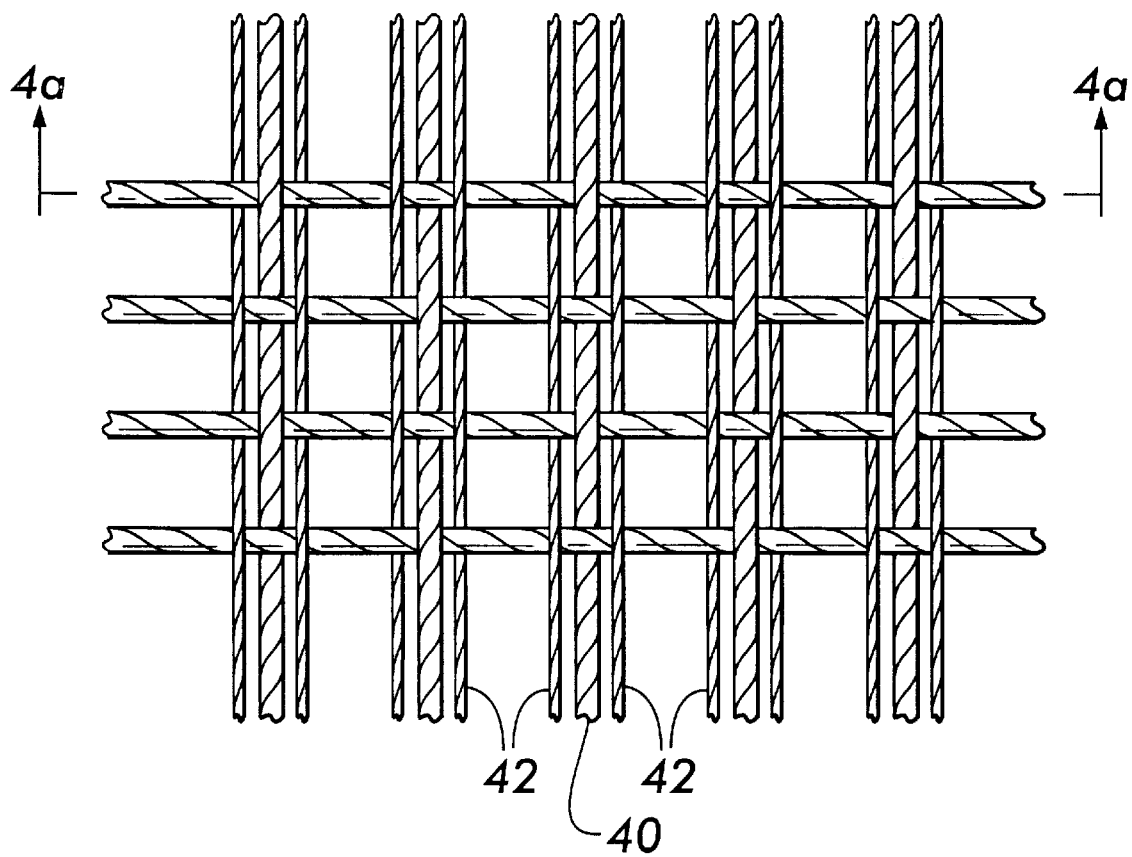
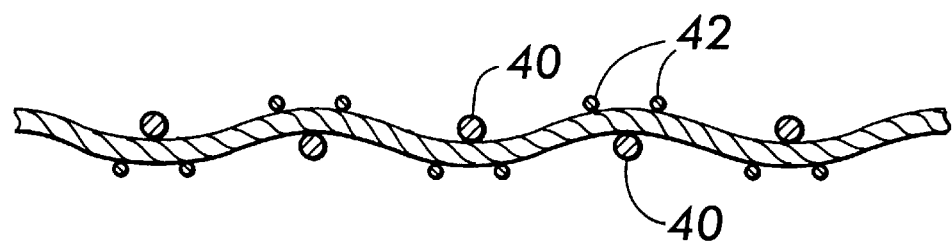
FIG.4a

WOVEN FABRIC HAVING IMPROVED FLEXIBILITY AND CONFORMABILITY

FIELD OF THE INVENTION

This invention relates to woven fabric sleeves for use in industrial applications as a protective or insulating covering for hoses, wires, piping and like objects and especially to flexible, conformable woven fabric sleeves.

BACKGROUND OF THE INVENTION

Woven fabric sleeves are used extensively to provide a protective or insulating layer over a vast variety of items. For example, a sleeve of woven material is often fitted over branches of an electrical wiring harness to bundle the individual wires together and to protect the wires against abrasive wear which might otherwise damage the insulation or the conductors and lead to short circuits or broken circuits. Another common application is as an insulator of hot tubing, such as is found in automobile exhaust manifolds or power plant steam lines. Sleeves performing an insulating function are typically woven or braided from insulating yarns or filaments and often laminated with coatings, films or foils which increase their insulating capability, for example, by providing a reflective surface blocking infrared radiation. Woven fabrics are, of course, used extensively to protect items having shapes other than tubular as well.

Woven fabrics are economical to manufacture and see extensive use in the protective covering role because woven fabrics provide stable and robust membrane structures due to the orthogonal orientation of the warp and weft yarns comprising the fabric. However, the orthogonal orientation of a woven fabric also tends to detrimentally inhibit flexibility and conformability. When compared with braided fabrics, for example, the orthogonal fabric structure of woven fabrics is not as flexible or conformable. There is clearly a need to provide increased flexibility and conformability to woven fabrics, thereby combining woven fabrics' inherent characteristics of stability and robustness and ease of manufacture with increased flexibility and conformability comparable to braided fabrics.

SUMMARY AND OBJECTS OF THE INVENTION

This invention provides woven fabric sleeving having increased flexibility and conformability as compared with traditional sleeving. Control of the relative flexibility of the sleeving, according to the invention, is provided by alternating circumferentially extending unidirectional zones of relative flexibility separating adjacent zones of inflexibility. The relatively flexible zones serve as pivot points about which the relatively inflexible zones pivot in a manner somewhat analogous to the ridges and valleys of corrugated or convolute tubing.

Woven fabrics are typically comprised of a multiplicity of first filamentary members arranged parallel to each other and interlaced with a plurality of second filamentary members oriented orthogonally (at 90°) to the first filamentary members. As used hereinafter, the terms filamentary members or members is used to mean wires, threads, yarn whether twisted or laid together, monofilaments and combinations of the above, including yarns formed by the DREF process. Where monofilaments are employed, relatively resilient engineered plastic materials are generally preferred, although resilient wire may sometimes serve as well. Particularly preferred monofilaments have a modulus of elasticity greater than 50,000 psi and preferably up to about 200,000 psi. Exemplary monofilament materials include polyester, aramid polymers as sold under the trademark Kevlar nylon 6 and nylon 6/6.

In a simple plain 1/1 weave, warp filamentary members cross over and under the weft filamentary members in an alternating pattern, i.e., for a given warp crossing over a particular weft filamentary member, the adjacent warp filamentary member will cross under the particular fill filamentary member, thereby locking the fill filamentary member in place.

In one embodiment of the invention, enhanced flexibility of tubular sleeves of woven fabric is achieved by use of alternating fill filamentary members of small and large diameter, thereby creating relatively empty spaces at the locations of the small diameter filamentary members. These relatively empty spaces function as pivot points for the relatively large diameter filamentary members resulting in substantial increases in flexibility and conformability of the fabric in the sleeve. The filamentary member employed in the fill may be relatively rigid or nonrigid. Heat shrinkable monofilaments may be used in preselected zones in the fill as a means of creating a self-locating protective sleeve.

Although tubular sleeves according to this embodiment of the invention are preferably made on a circular weaving machine, conventional looms producing flat fabrics may be employed. The flat fabrics preferably incorporate heat settable monofilaments or ductile wire. Where heat settable monofilaments are employed, the monofilaments are heat set on a mandrel to form a tubular sleeve. DREF yarns consisting of polyester monofilaments as a core with spun staple polyester as an outer layer combine the property of being heat settable with the texture and friction of a multifilament. The flat fabric may conveniently be used in the production of laminated sleeves as by application of foils or films to one or both surfaces.

According to another embodiment of the invention, pivot points in the product are provided by use of one size diameter fill yarn and an intermittent take-up system. A bellows effect is created by stacking picks at predetermined discrete locations lengthwise of the fabric. This embodiment has the capability of being tailored to meet particular curvatures. Use of the intermittent stacking system allows for incorporation of the bellows at predetermined locations. In carrying out this embodiment, in a preferred form, warp yarns were twisted glass fiber. Wire served with glass fiber was used in the fill. In an exemplary product, four picks were placed in the fabric before the take-up advanced, thus creating bundles of filaments spaced apart by single picks. The flat material was then curled so that a tubular article having a side opening was formed. The product flexibility can be increased by increasing the number of picks per inch between the stacked picks.

In each of these embodiments, the alternating configuration of larger and smaller diameter weft members results in a fabric having alternating adjacent regions of greater and lesser relative flexibility. The regions between the large diameter filamentary members allow for relative pivotal movement of the regions having the large diameter filamentary members. Due to the tendency of the fabric to pivot more readily about the regions of lesser stiffness, it becomes more flexible and conformable to irregular contours than typical fabric woven with uniform diameter weft filamentary members.

In yet another embodiment, the warp members are grouped in pairs, each warp member having a neighbor warp member. Weft members are interlaced with the warp members, but in between each weft member, the warp member pairs are twisted around one another, in effect eliminating the alternate weft members and reducing the separation of the warp members almost to zero in between the weft members. This is known in the art as a Leno type weave. In this weave, regions of relatively greater stiffness are formed in the fabric along the weft members where the warp members cross and adjacent regions of relatively lesser stiffness are formed in the spaces in between the weft members where the warp member pairs are twisted together. The empty spaces between weft members function as pivot points resulting in a flexible fabric which readily conforms to complex contours. The relative effectiveness of the pivot points can be augmented or diminished by adjusting the size of the weft members. Weft member size can be set either by using single strands of a predetermined diameter or pairs of even bundles of strands built up to a desired effective diameter.

Still other embodiments of the invention involve the interlacing of filamentary members utilizing mock Leno weaving. The mock Leno weaving places the warp yarns in groups with intervening empty spaces which lock the weft yarns in place in spaced apart relationship, thereby providing a flexible fabric structure characteristic of Leno fabrics without twisting of the warp members.

Fabric having increased flexibility and conformability according to the invention is advantageously employed in the production of flexible sleeving used for industrial purposes as for the covering of piping, wiring and other tubular shaped items. By using the teaching of the use of the invention, the relative stiffness of the sleeving can be controlled to produce a flexible fabric sleeves tailored to a particular curvature. The flexibility can be built into the sleeve at predetermined regions where flexibility is required.

Giving the warp members a helical turn relative to the long axis of the sleeve has been found to reduce the stiffness of the sleeve because helically extending warp members are eccentrically loaded (not loaded along their center lines) in compression and tension when the sleeve is bent when conforming to a curve. The eccentric loading induces additional bending forces in the warp members not normally present in straight warp members with the result that the warp members yield more readily under compression or tension forces, thus making the sleeve more conformable and flexible.

All of the embodiments described above, as well as other embodiments incorporating the principles of the invention, are particularly suited to laminating with other materials such as films, foils coatings and heat set wrappings. When laminated, sleeving according to the invention is found to be more flexible and conformable than conventional woven sleeves similarly laminated. This provides a great advantage for example with insulating sleeves laminated with metallic foils which reflect infrared radiation. The stiffening effect of the foil is compensated for by the increased flexibility of the woven fabric substrate, yielding a conforming sleeve with both superior insulating characteristics and enhanced flexibility not otherwise achieved with sleeves made of conventional woven fabrics. In another example, woven fabric according to the invention laminated with a heat settable wrap is easily conformed to a curved shape, such as a pipe elbow bend, and then heat set into shape. The increased flexibility and conformability of the woven fabric according to the invention yields a superior covering which adjusts easily to and holds complex shapes.

The filamentary members can be virtually any fiber, yarn or filament in the various embodiments of the invention. For example, textured polyester multifilament yarns in the warp have been combined with materials such as monofilament polyesters or DREF yarns in the weft with good results. Glass fiber yarns may be used, as well as wires served with glass. Sleeves woven wholly or in part of multifilament yarns may be coated or impregnated with coatings as is well known in the art. For static electricity dissipation applications, conducting weft members made from stranded copper wire, for example, are used to avoid unwanted static charge build-up. Heat shrinkable members are especially useful as weft members in the production of heat shrink sleeving.

It is an object of the invention to provide a woven fabric sleeve having enhanced flexibility and conformability, as compared with conventional woven fabric sleeves.

It is another object of the invention to provide a means for controlling the relative stiffness of woven fabrics used for sleeving applications.

It is yet another object of the invention to provide a fabric sleeve having areas which are relatively more flexible than other regions within the sleeve.

It is another object of the invention to provide a means for controlling the flexibility and conformability of woven fabric sleeves.

It is still another object of the invention to provide a woven fabric used for protective sleeves which remains relatively flexible when laminated with a foil, film, coating or the like.

These and other objects will become apparent from a consideration of the following drawings and detailed description of preferred embodiments of the invention.

BRIEF DESCRIPTION OF THE DRAWINGS

FIG. 1a is a perspective view of a sleeve having the fabric construction of FIG. 1;

FIG. 1b is a perspective view of another form of sleeve of the invention;

FIG. 4 is a plan view of another fabric construction for a fourth sleeve embodiment formed according to the invention;

FIG. 4a is a sectional view along line 4a—4a of FIG. 4; and

DETAILED DESCRIPTION OF PREFERRED EMBODIMENTS

Figure 1:
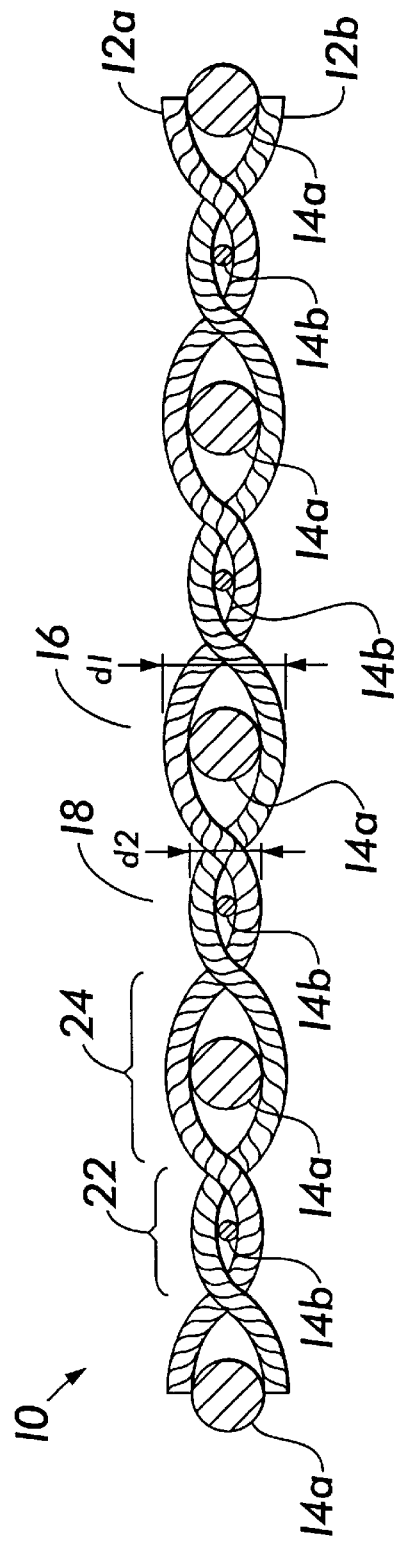
FIG. 1 shows a cross-sectional side view illustrating the fabric construction of a first embodiment of a woven fabric sleeve according to the invention.

FIG. 1 is a schematic showing a cross-sectional side view of a portion of a fabric 10 of 1/1 plain weave construction formed into a sleeve according to one embodiment of the invention. Neighboring warp filamentary members 12a and 12b are interlaced with weft filamentary members 14a and 14b, the warp filamentary members 12a–12b passing alternately above and below the weft filamentary members 14a and 14b. As will be recognized, neighboring warp member pairs such as 12a and 12b do not pass over and under the same weft members together, but alternate, 12a passing over a particular weft member 14a while 12b passes under that particular weft member. This pattern is repeated throughout the fabric, thereby locking the weft members in place. Note that warp members 12a and 12b are representative of other warp members arrayed adjacent to each other in the plane of the drawing.

According to the first embodiment of the invention, weft members 14a and 14b are of alternating large and small diameter. Although a variety of filamentary materials may be employed, one example of this embodiment was woven on a circular loom and incorporated 0.010" diameter polyester monofilaments in the warp and 0.027" diameter monofilaments alternating with 0.010" diameter monofilaments in the weft. The warp monofilaments were comprised of two ends.

A second example used 1250 denier texturized polyester multifilament yarn in the warp and employed large and small diameter polyester monofilaments of 0.027" and 0.010" diameter, respectively, in an alternating pattern forming a sleeve approximately 1" in diameter. Since these products were made on a circular loom, a slight twist was introduced in the warp direction. The resulting sleeves were very flexible and conformable. The small diameter monofilaments created circumferential zones of relative flexibility separating the relatively stiff, large diameter monofilaments. This construction allowed for curvature of the sleeves on relatively sharp radii without kinking. Glass fiber yarns may be substituted for polyester in the warp. Stainless steel wire may be substituted for the polyester monofilaments in whole or in part.

A sleeve woven on a circular loom in accordance with examples one and two is schematically shown in FIG. 1a at 16. Sleeve 16 may have laminated to it a cover layer 18 formed, for example, from an adhesive bonded metalized reflective film.

A similar sleeve woven on a conventional loom is made from a flat fabric formed into tubular shape and resiliently set by the application of heat. This sleeve is shown in FIG. 1b and employed polyester monofilaments in the fill of about 0.10" in diameter. The flat fabric was wrapped on a mandrel and heated to set the resilient monofilaments. A side opening 20 allows for fitting the sleeve over elongated substrates, as shown at 22 and allows for breakouts.

Still a third example incorporating the weave shown in FIG. 1 and woven on a circular loom used 1250 denier texturized polyester yarn in the warp and stranded copper wire of about 0.025" diameter in the fill alternating with 1250 denier polyester yarn. The copper wire is provided for the dissipation of static electricity. This sleeve was exceptionally flexible but lacked the circumferential stiffness provided by examples one and two.

Figure 2:
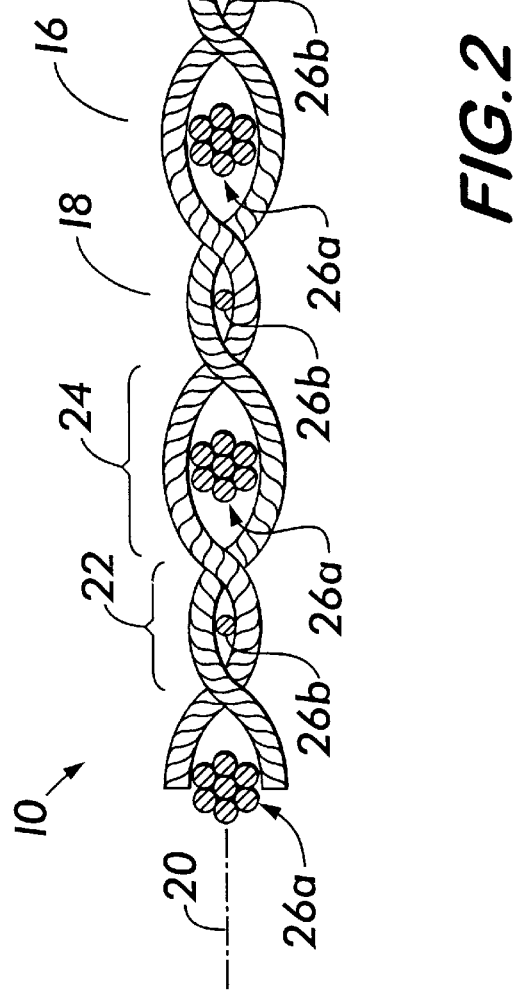
FIG. 2 shows a cross-sectional side view illustrating the fabric construction of a second embodiment of a woven fabric sleeve according to the invention.

FIG. 2 shows another embodiment of a woven fabric 10 according to the invention where weft filamentary members 26a are formed from a plurality of individual weft monofilaments 26 formed into a bundle. Bundled weft monofilaments 26a have a greater effective diameter than adjacent weft monofilaments 26b which preferably have a diameter equal to monofilaments 26. The example of FIG. 2 was constructed with the use of an intermittent take-up by stacking picks at discrete locations extended circumferentially of the fabric. In the example of FIG. 2, a glass fiber yarn was used in the warp, and relatively ductile wire served with glass was used in the fill. Four picks were placed in the fabric before the take-up advanced. In a sleeve made on a conventional loom, flat fabric was formed, placed on a mandrel and curled to form a sleeve similar to the sleeve of FIG. 1b. The shape of the sleeve was retained by the curled wires.

Figure 3:
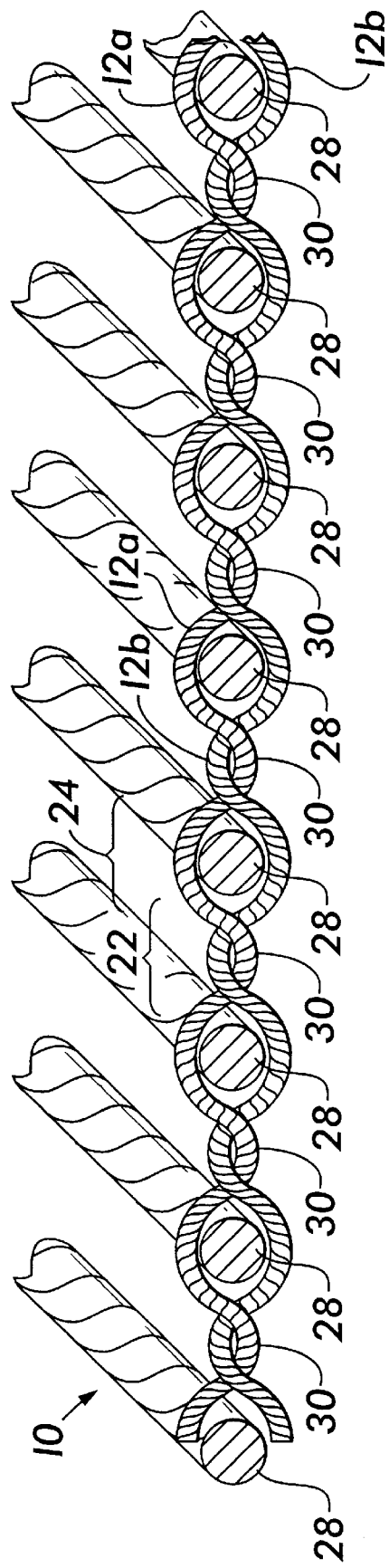
FIGS. 3 and 3a are cross-sectional side views and plan views of a third embodiment illustrating a different fabric construction for carrying out the invention.

FIG. 3 shows another embodiment of a woven fabric 10 according to the invention wherein weft members 28 are spaced apart by twists formed in warps 12a and 12b. In the embodiment of FIG. 3 warp members such as represented at 12a are each paired with an adjacent neighbor member 12b. Instead of being interlaced with weft members in an alternating pattern as in the previous embodiments, the warp member pairs 12a and 12b are twisted about each other as seen at 30, after passing over and under a weft member 28 utilizing a Leno harness which lifts and twists the warp yarns during every weft insertion. This is the characteristic of the so called Leno weave, where every other weft member is eliminated and replaced by a warp member twist 30. The twisting effect secures a filling yarn or pick in place and allows for less picks per inch to form a stable but flexible fabric. The empty spaces where the twists occur between the fill members create pivot points which allow the sleeve to readily contour over sharp curves.

Although other ways of establishing the fabric in a sleeve shape may be employed, such as by use of heat setting resiliently settable monofilaments used in the fill, a preferred method involves coating a sleeve with a B-stage epoxy and allowing the epoxy to dry without curing. The coated sleeve material is then formed with a sleeve shape and heated to cure the epoxy. The sleeve maintains its shape even at high temperature on account of the thermosetting characteristic of the epoxy. In the illustrative embodiment, the yarn employed was a Nomex DREF yarn, and the sleeve was made using the Leno weave. The fabric so formed was laminated with aluminum foil using a hot melt adhesive and was slit to width following lamination and then kiss coated with the epoxy.

Another embodiment of the invention, whose construction is illustrated in FIG. 4, is a fabric sleeve incorporating a mock Leno weave. The mock Leno weave increases flexibility, forms the warp members into groups with empty spaces intervening, giving the open fabric structure without a twisting of warp members. According to FIG. 4, spaced groups of three warp members which preferably may comprise a relatively large diameter warp member 40 or a bundle of smaller warp members with pairs of relatively small diameter warp members 42 are woven with fill yarns 44. At each cross over, the fill yarns 44 are locked in place between groups of three warp members which preferably comprise a relatively large diameter warp yarn and a pair of small diameter warp yarns. As shown, the middle warp yarn of each group passes on the opposite side of each fill yarn in an alternating over-and-under pattern locking the fill yarns in spaced apart relationship. Zones of relative flexibility are created by separating the fill yarns. The spaces between the fill members can be varied as required to provide the sleeve with the requisite flexibility and conformability. The fill members may be resiliently settable monofilaments set to cause the fabric to resiliently form a sleeve.

Figure 5:
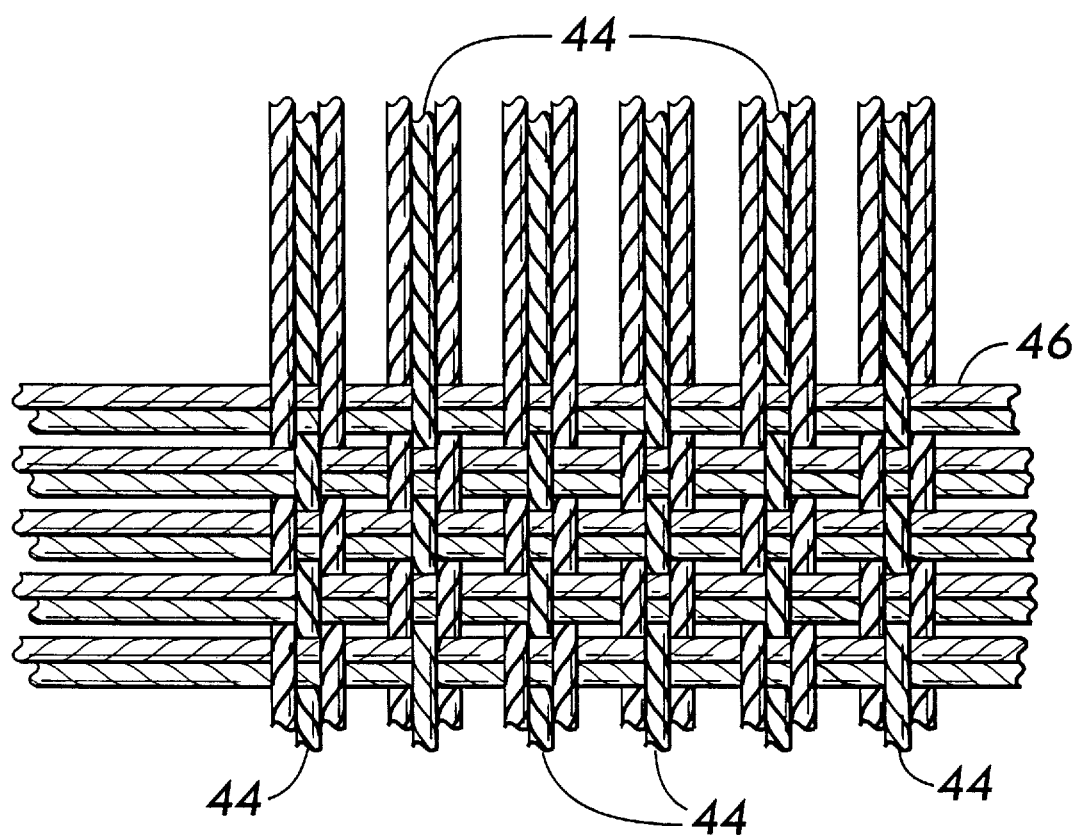
FIG. 5 is a plan view of another embodiment of the invention of similar construction to the embodiment of FIG. 4.

The fabric construction of the sleeve embodiment of FIG. 5 is similar to FIGS. 4 and 4a in that a mock Leno weave is employed. In FIG. 5, a yarn such as a texturized polyester multifilament is used in the warp in groups of three yarns 44. The fill fiber is a DREF yarn 46 comprised of a polyester monofilament over which staple polyester is spun. As illustrated in FIG. 5, the fill yarns 46 are placed in spaced apart groups of two, although a greater or smaller number may be employed. The fabric so constructed is formed into tubular shape on a mandrel and heat is applied to cause the core monofilaments of the DREF yarn to resiliently set. When so formed, the fill members may assume somewhat of a bias relatively to the warps. The resulting sleeve has excellent flexibility, is a relatively closed construction as compared with the embodiment of FIG. 4 and is abrasion resistant. The fill yarns combine the heat setting properties of a monofilament with the texture and feel of a multifilament.

Woven fabric sleeves according to the invention have improved flexibility and conformability as compared with conventional woven fabric sleeves. The flexibility of the fabric can be tailored by the introduction of zones of flexibility between relatively inflexible zones. In all embodiments, the zones extend circumferentially so that the sleeving flexes similarly to convolute or corrugated tubing.

Figure 3A:
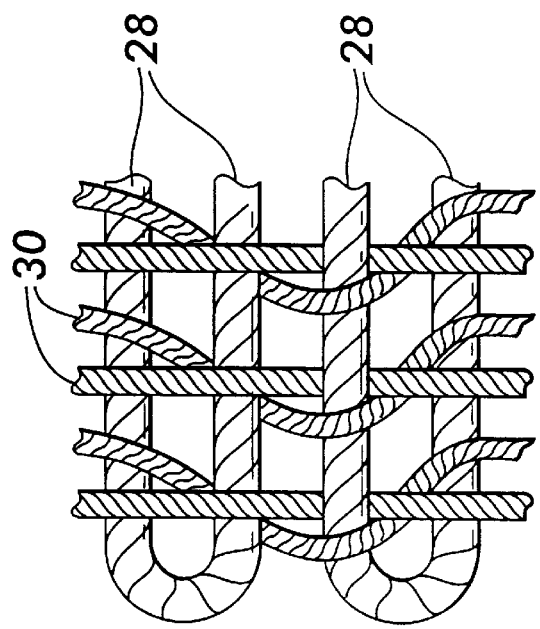

The provision of filamentary weft members of large and small diameter in the examples of FIGS. 1 and 2 produces the pivot points which enable the sleeves to conform to complex shapes and severe curvatures. In FIGS. 3 and 3a, this flexibility is accomplished by twisting the warp yarns to create empty spaces between the fill yarns creating pivot points which function similarly to the pivot points of FIGS. 1 and 2. In the construction of FIGS. 4 and 4a, open spaces which form pivot points are created between adjacent fill yarns by the use of groups of three warp yarns to lock the fill yarns in place. By virtue of the characteristics of increased flexibility and conformability woven fabrics according to the invention are suitable for a wider variety of applications than heretofore possible with conventionally woven fabric sleeves.

We claim:

1. A woven fabric sleeve for protecting and covering elongated substrates, said sleeve comprising:

circumferentially and longitudinally extended orthogonally interlaced fill and warp members;

said fill members forming circumferentially extending alternating bands of relative flexibility separating bands of inflexibility.

2. A woven fabric sleeve according to claim 1, wherein said fill members comprise first members having a first diameter and second members having a second diameter smaller than the first, said second members being spaced between said first members.

3. A woven fabric sleeve according to claim 2, wherein said second members are comprised of stranded wire.

4. A woven fabric sleeve according to claim 2, wherein said first members are monofilaments.

5. A woven fabric sleeve according to claim 4, wherein said monofilaments comprising the first members are resilient.

6. A woven fabric sleeve according to claim 4, wherein said first members have at least twice the diameter of said second members.

7. A woven fabric sleeve according to claim 2, wherein said first members comprise bundles of said second members.

8. A woven fabric sleeve according to claim 1, wherein said warp members are arranged in groups, the warp members of each group being twisted at locations on each of said selected fill filamentary members to lock said selected fill filamentary members in place, said locations being positioned within the bands having relatively greater flexibility.

9. A woven fabric sleeve according to claim 8, wherein said warp members are arranged in pairs.

10. A woven fabric sleeve according to claim 1, wherein said warp members comprise groups of relatively flexible warp yarns, each group comprising a first warp yarn disposed between a pair of second warp yarns, said first warp yarn and said pair of second warp yarns being woven in interlocking relationship with at least one of said fill yarns in a mock Leno weave pattern.

11. A woven fabric sleeve according to claim 10, wherein said first yarns of each group are of larger diameter than the second yarns of said group.

12. A woven fabric sleeve according to claim 11, wherein said warp members are monofilaments.

13. A woven fabric sleeve according to claim 10, wherein said weft yarns are grouped in pairs, at least one of the yarns of a pair having a resiliently settable core.

14. A woven fabric sleeve according to claim 10, wherein said weft yarns comprise at least one yarn having a resiliently settable core resiliently set to maintain said sleeve in a substantially tubular configuration.

* * * * *